US007379119B1

(12) United States Patent
Schuetz

(10) Patent No.: US 7,379,119 B1
(45) Date of Patent: May 27, 2008

(54) SURVEILLANCE CAMERA MOUNT

(75) Inventor: Mark A. Schuetz, New Albany, OH (US)

(73) Assignee: Replex Mirror Company, Mount Vernon, OH (US)

( * ) Notice: Subject to any disclaimer, the term of this patent is extended or adjusted under 35 U.S.C. 154(b) by 814 days.

(21) Appl. No.: 10/686,247

(22) Filed: Oct. 15, 2003

(51) Int. Cl.
*H04N 5/225* (2006.01)
*H04N 7/18* (2006.01)

(52) U.S. Cl. ...................................... 348/375; 348/151

(58) Field of Classification Search ................ 348/375, 348/143, 151, 373
See application file for complete search history.

(56) References Cited

U.S. PATENT DOCUMENTS

| | | | | |
|---|---|---|---|---|
| 4,225,881 | A * | 9/1980 | Tovi | 348/151 |
| 4,618,886 | A * | 10/1986 | Mooney | 348/143 |
| 4,764,008 | A * | 8/1988 | Wren | 396/427 |
| 4,918,473 | A | 4/1990 | Blackshear | 354/81 |
| 4,945,367 | A | 7/1990 | Blackshear | 354/81 |
| 5,111,288 | A | 5/1992 | Blackshear | 358/108 |
| 5,121,215 | A | 6/1992 | Boers et al. | 358/229 |
| 5,181,120 | A | 1/1993 | Hickey et al. | 358/229 |
| 5,418,567 | A | 5/1995 | Boers et al. | 348/375 |
| 5,421,667 | A | 6/1995 | Leyden et al. | 403/406.1 |
| 5,861,807 | A | 1/1999 | Leyden et al. | 340/568 |
| 6,027,277 | A | 2/2000 | Leyden et al. | 403/291 |
| 6,039,498 | A | 3/2000 | Leyden et al. | 403/61 |
| 6,087,939 | A | 7/2000 | Leyden et al. | 340/568.2 |
| 6,226,035 | B1 | 5/2001 | Korein et al. | 348/335 |
| 6,261,122 | B1 | 7/2001 | Richter | 439/477 |
| 6,735,382 | B2 * | 5/2004 | Schneider | 396/26 |
| 7,046,295 | B2 * | 5/2006 | Hovanky | 348/373 |
| 2002/0060745 | A1 | 5/2002 | Bowden et al. | 348/373 |
| 2002/0154218 | A1 | 10/2002 | Loyd et al. | 348/151 |
| 2002/0171557 | A1 | 11/2002 | Wegener | 340/693.6 |
| 2003/0103138 | A1 | 6/2003 | Assayag et al. | 348/143 |

OTHER PUBLICATIONS

AutoDome Reference Guide, Glossary of AutoDome Terms, Bosch Security Systems, pp. 23-26.

Indoor Housings: MPG Multi-Position Globe Series, Product Information and Technical Specifications, Wren Associates Limted, Jun. 2003, 2 pages.

Indoor Housings: MPG Multi-Position Globe Series, Instructions to Mount, Assemble & Install the Wren Multi-Position Globe Unit, Wren Associates Ltd., 2002, pp. 1-5.

Indoor Housing: SDR6 Six Inch Dome/Flat Lens For Fixed Cameras, Instructions to Mount, Assemble, Wire & Install the Wren 6" Dome For Fixed Cameras, Wren Associates Ltd., 2002, pp. 1-5.

(Continued)

*Primary Examiner*—Ngoc-Yen Vu
*Assistant Examiner*—Adam L Henderson
(74) *Attorney, Agent, or Firm*—Standley Law Group LLP

(57) ABSTRACT

A surveillance camera mounting apparatus for facilitating installation of a surveillance camera on a mounting pole such as a conduit. Typical installations on a conduit include a globe enclosure for protection of the camera equipment and to discourage a person from avoiding the aim of the camera. The mounting apparatus may also be adapted to mount a surveillance camera in a ceiling. A pivotable saddle allows for the top or bottom attachment to a camera. Adjustments facilitated by the saddle provide for positioning the camera to have its optical axis maintained in a position normal to the tangential surface of a globe enclosure over almost any vertical or horizontal position of the camera.

33 Claims, 11 Drawing Sheets

OTHER PUBLICATIONS

Low-Cost Dome KTA-L Series, Economical Indoor and Outdoor Housings For Fixed Cameras, GE Interlogix Kalatel Division, Sep. 2002, pp. 1-4.

LTC 9349 Series Fixed Dome Housings, Installation Instructions, Philips Electronics N.V. and Philips Communications & Security Systems Inc., 1999, pp. 1-11.

* cited by examiner

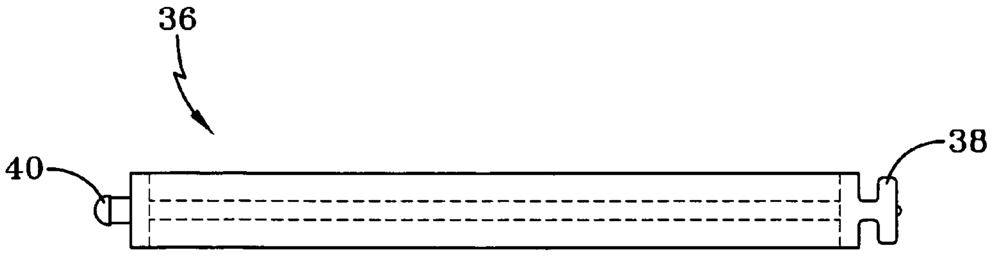
FIG-3b
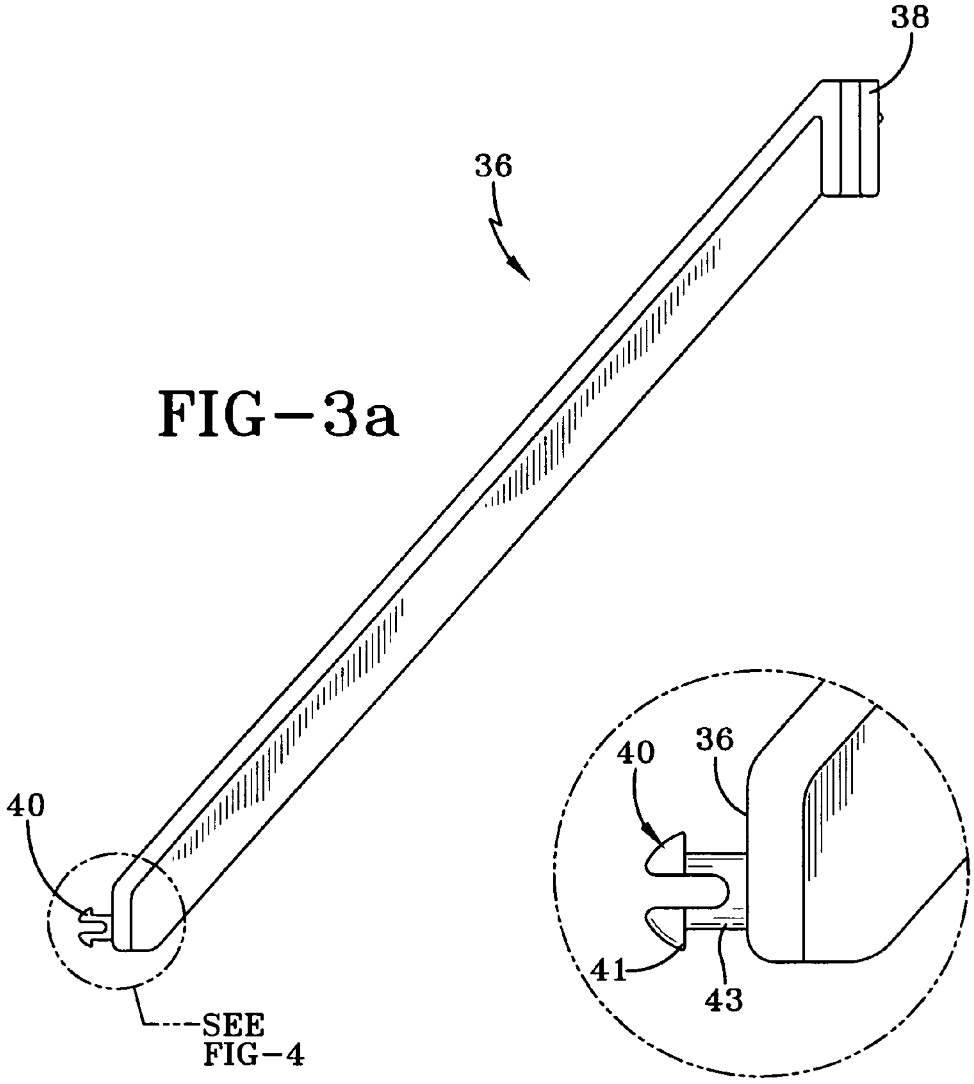
FIG-3a
FIG-4

NOTE: CHOOSE A SADDLE POSITION WHICH WILL PLACE THE CENTER OF THE CAMERA ON THE CENTER OF THE PIVOT POINT.

SURVEILLANCE CAMERA MOUNT

BACKGROUND AND SUMMARY OF THE INVENTION

The present invention relates to an apparatus for mounting a surveillance camera. The surveillance camera mounting apparatus of the present invention facilitates the installation of a surveillance camera on a mounting pole such as a conduit. Typical installations on a conduit include a globe enclosure for protection of the camera equipment and to discourage a person from avoiding the aim of the camera. The mounting apparatus may also be adapted to mount a surveillance camera in a ceiling. A pivotable saddle allows for the top or bottom attachment to a camera. Adjustments facilitated by the saddle provide for positioning the camera to have its optical axis maintained in a position normal to the tangential surface of a globe enclosure over almost any vertical or horizontal position of the camera.

The present invention is a surveillance camera mount apparatus comprised of a saddle for attachment of the camera, an outer yoke, and at least one leg. The saddle of the present invention may be rotated about an axis to allow a top or bottom mount of a camera to the saddle. The present invention typically includes a pivotable connection between the saddle and the yoke. The present invention may include a three-point alignment for attachment of the legs of a camera mount of the present invention. As a result of the three-point alignment, the saddle of the camera mount may be always oriented toward a viewing slot in a globe or hemispherical enclosure of the present invention. The present invention may include a multi-piece globe or a hemispherical-shaped enclosure for the camera and the camera mount.

BRIEF DESCRIPTION OF THE DRAWINGS

In addition to the novel features and advantages mentioned above, other objects and advantages of the present invention will be readily apparent from the following descriptions of the drawings and preferred embodiments.

FIG. 3*a* is a side elevational view of an embodiment of the leg of the present invention.

FIG. 3*b* is a top elevational view of an embodiment of the leg of the present invention.

FIG. 4 is a side elevational view of an embodiment of the pin of the present invention.

DETAILED DESCRIPTION OF THE EXEMPLARY EMBODIMENT(S)

The exemplary embodiments discussed below are preferably made from a plastic material. Preferred embodiments of at least portions of the present invention may be manufactured via an injection molded plastic process. In addition to plastic, at least portions of the present invention may be made from other similar material including plastic-containing compounds. At least portions of the present invention may be manufactured from metals, such as aluminum, or glass. Other suitable materials for use in the manufacture of alternative embodiments include those materials well known in the art for the manufacture of surveillance equipment.

Figure 1A:
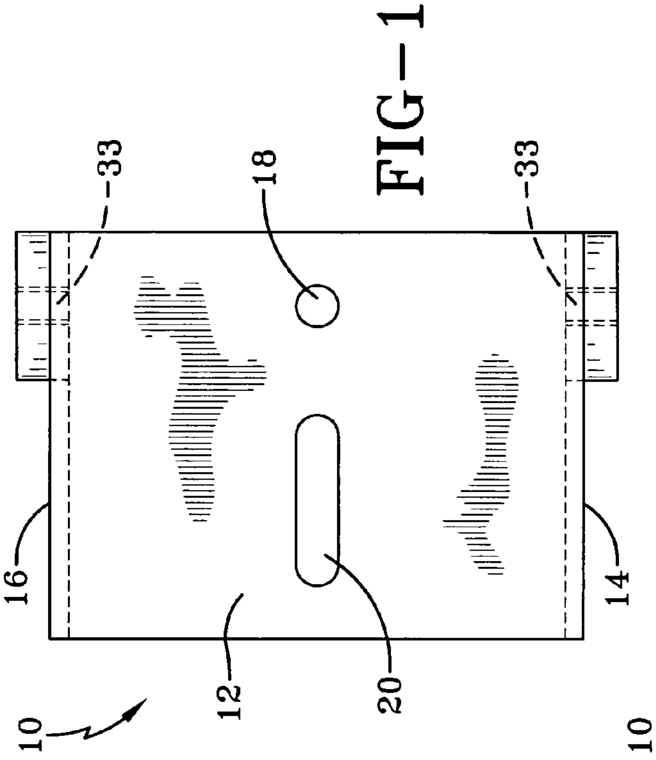
FIG. 1*a* is a top elevational view of an embodiment of the saddle of the present invention.
Figure 1B:
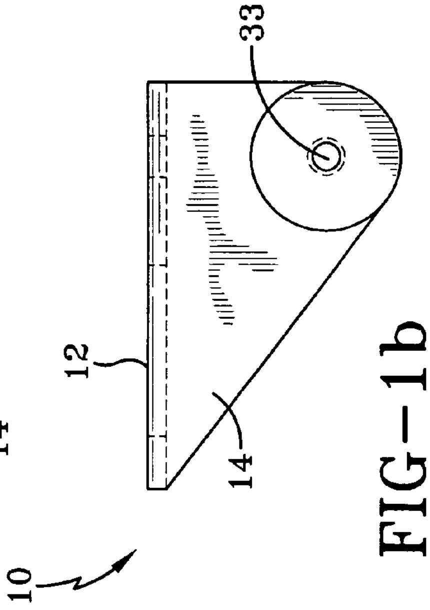
FIG. 1*b* is a side elevational view of an embodiment of the saddle of the present invention.
Figure 1C:
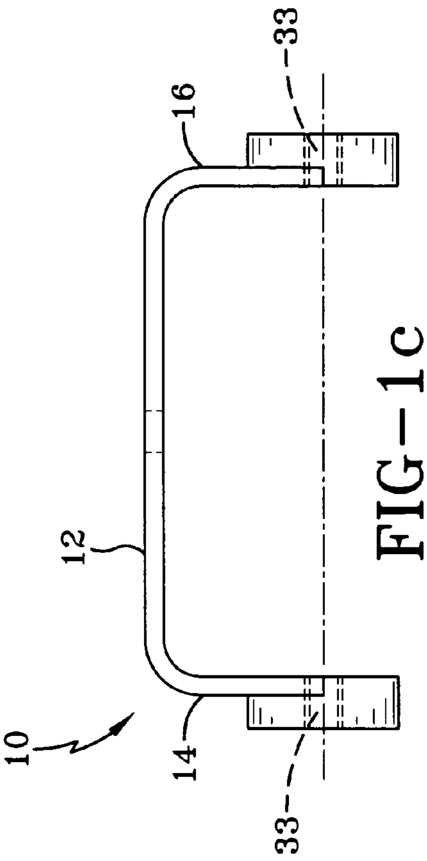
FIG. 1*c* is a front elevational view of an embodiment of the saddle of the present invention.

An exemplary embodiment of a saddle 10 of the present invention is shown in FIGS. 1*a*, 1*b*, and 1*c*. As can be observed, the saddle is comprised of a base 12, a first connecting arm 14, a second connecting arm 16, and two threaded inserts 33. This exemplary embodiment of the saddle 10 is also shown with a hole 18 defined by a diameter and a slot 20 defined by a width and a length. Both the hole 18 and the slot 20 provide a means to removably secure a surveillance camera to the base 12 of the saddle 10. For example, a threaded connector, such as a set screw may pass through either the hole 18 or the slot 20 and be secured into a threaded receptacle on a camera. Such threaded receptacles integrated into the body of a surveillance camera are well known throughout the art. The present invention may include either the hole 18 or the slot 20 as shown in the exemplary embodiment of the saddle 10. The threaded inserts 33 will be used to make a pivotable connection with the outer yoke of the present invention. A typical pivotable connection with the outer yoke of the present invention would be comprised of a threaded device such as a screw or a bolt passing through portions of the outer yoke and the threaded device being secured into the threaded inserts 33 on the saddle 10. It should be noted that the saddle 10 may be pivoted about an axis and positioned to provide a substantially upward U-shaped receptacle for receiving a camera. In this manner, the saddle 10 may be attached to a lower surface of, or underneath, the camera. In addition, the saddle 10 may be pivoted about the same axis and positioned to provide a substantially downward U-shaped receptacle for receiving a camera. In this manner, the saddle 10 may be attached to an upper surface, or the top, of the camera. In addition, the saddle 10 or the camera itself may be connected to a motor or other positioning device as are typically used for changing the direction and/or view of a surveillance camera.

Figures 2A, 2B, 2C, 2D:
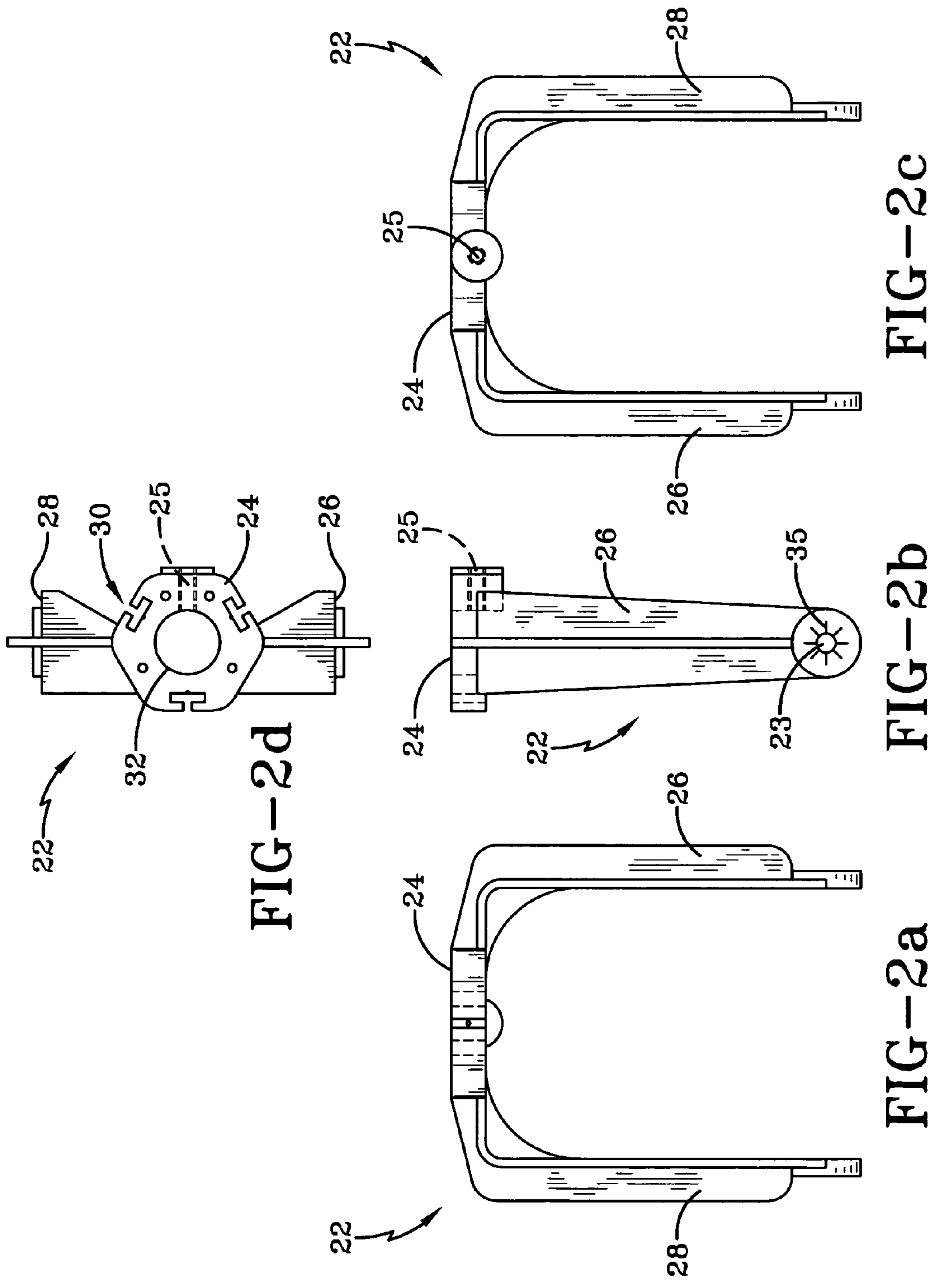
FIG. 2*a* is a front elevational view of an embodiment of the outer yoke of the present invention.
FIG. 2*b* is a side elevational view of an embodiment of the outer yoke of the present invention.
FIG. 2*c* is a rear elevational view of an embodiment of the outer yoke of the present invention.
FIG. 2*d* is a top elevational view of an embodiment of the outer yoke of the present invention.

An exemplary embodiment of an outer yoke 22 of the present invention is shown in FIGS. 2*a*, 2*b*, 2*c*, and 2*d*. As can be observed, the outer yoke 22 is comprised of a hub 24, a first hanger arm 26, a second hanger arm 28, a threaded insert 25 for a set screw, at least one channel 30, a hole 32 defined by a diameter, a pair of holes 23 defined by a diameter, and friction ribs 35. Both the first hanger arm 26 and the second hanger arm 28 are spaced so as to allow the saddle 10 to be nested within the arms 26 and 28. As shown in FIG. 1*b*, the threaded inserts 33 of the saddle 10 will be used to make a pivotable connection with the outer yoke 22 of the present invention. A typical pivotable connection with the outer yoke 22 would be comprised of a threaded device such as a screw or a bolt passing through the holes 23 in the respective hanger arms 26 and 28 of the outer yoke 22 and the threaded device being secured into the threaded inserts 33 on the saddle 10. Although not shown, friction ribs such as those shown as element 35 of FIG. 2*b*, may be used on either, or both, of the contact surfaces between the saddle 10 and the arms 26 and 28 of the outer yoke 22. The friction ribs (not shown) would be used to control the rotation of the saddle 10 about an axis that is part of the pivotable connection with the outer yoke 22. Alternatives to the friction rib feature discussed above include, but are not limited to, the use of a grooved washer or a friction washer. FIG. 2*b* shows the outer yoke 22 with friction ribs 35 that may be part of the pivotable connection with the saddle 10 of the present invention. The friction ribs 35 are optional, one of their purposes is to provide a locking effect with the underside of a threaded device, such as a screw or a bolt, that may be used as part of the pivotable connection between the saddle 10 and the outer yoke 22.

This exemplary embodiment of the outer yoke 22 is shown with the hole 32 having a diameter sufficiently sized to provide a complementary fit for a mounting tube, such as a conduit, for supporting the surveillance camera mount apparatus of the present invention. In addition the exemplary embodiment of the outer yoke 22 is shown with the hub 24 having a threaded insert 25 for a set screw that may be used to secure the surveillance camera mount to the mounting tube. Use of the set screw is optional, as a typical installation of the camera mount of the present invention may be secured by inserting and bending a cotter pin through a hole in the mounting tube that supports the hub 24 of the outer yoke 22 (not shown).

In addition, the outer yoke 22 is shown with channels 30 that are at least defined by a width and a length. The channels 30 provide a complementary fit for a leg connector that may be part of the leg element of the present invention.

An exemplary embodiment of a leg 36 of the present invention is shown in FIGS. 3*a* and 3*b*. As can be observed, the leg 36 of the present invention is comprised of a leg connector 38 and a pin 40. As shown, the leg connector 38 is at least defined by a length and a width. Also, as shown in FIGS. 3*a* and 3*b*, the leg connector 38 is shaped to have a complementary fit with the channel 30 of the hub 24 of the outer yoke 22. With reference to FIG. 2*d*, the profile of the channel 30 is illustrated to fit at least a portion of the leg connector 38 profile shown in FIG. 3*b*. As illustrated in FIGS. 2*d* and 3*b*, the complementary shaped portions are generally T-shaped. In addition, the leg 36 is shown with a pin 40. The pin 40 may be used to connect a housing, such as a lower dome, to the leg 36. Typically, the pin would be inserted into a receptacle on the housing to securely hold the housing. Preferred embodiments of the pin 40 of the leg 36 may include shaped profiles such as is shown on FIG. 4. As shown in FIG. 4, the pin 40 allows for the non-plastic deformation of the head 41 of the pin as a housing (not shown) is snapped onto the shaft 43 the pin 40.

Figure 5B:
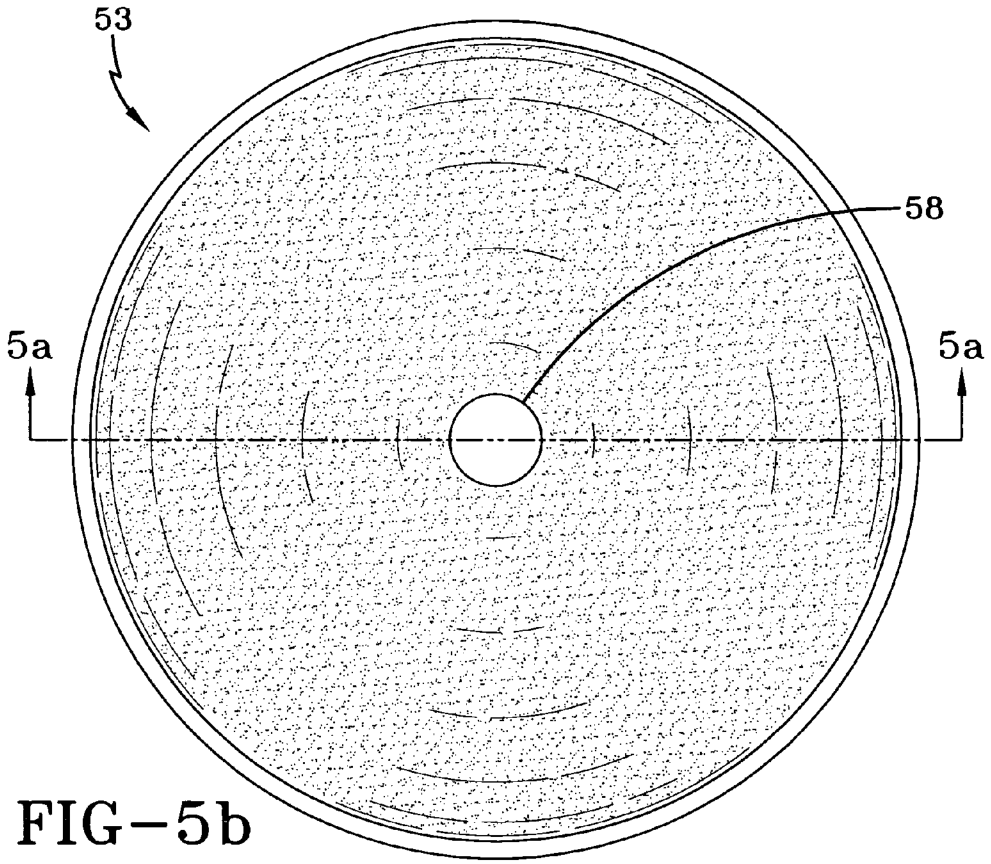
FIG. 5*b* is a top elevational view of an embodiment of the upper dome of the present invention.
Figure 5A:
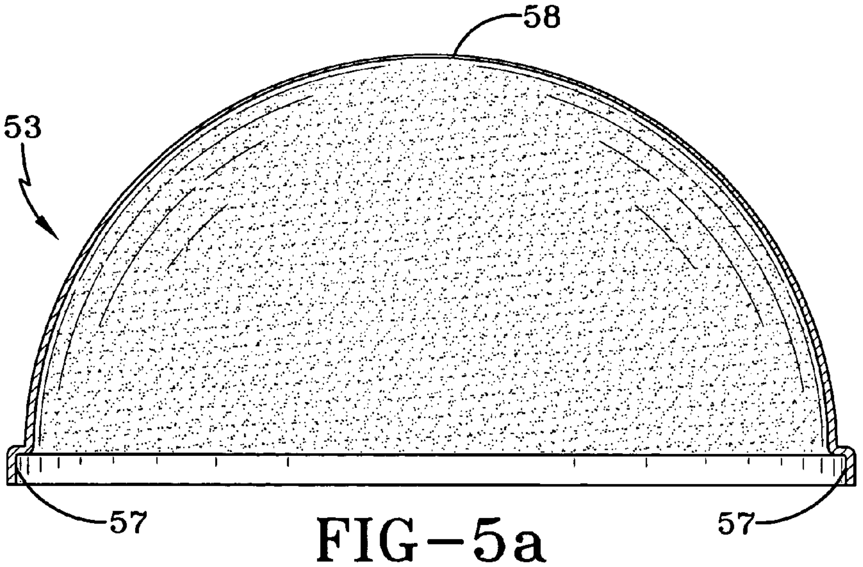
FIG. 5*a* is a side elevational view of an embodiment of the upper dome of the present invention.

An exemplary embodiment of the upper dome 53 of the present invention is shown in FIGS. 5*a* and 5*b*. As can be observed, the upper dome 53 is comprised of a hole 58 defined by a diameter. The hole 58 is sufficiently sized to allow a mounting tube, such as a conduit, to pass through the upper dome 53 that may be used to install the surveillance camera mount of the present invention. Although not shown in FIGS. 5*a* and 5*b*, the hole 58 may be sized to fit an O-ring, a grommet, or other type of gasket between the hole 58 and the mounting tube. This means for sealing the hole 58 in the upper dome provides a seal against elements in the environment such as insects, smoke, moisture, and dust that may build up over time or abruptly disrupt the ability of a camera to shoot surveillance images through any portion of an at least partially transparent housing comprising an embodiment of the present invention.

Figure 6B:
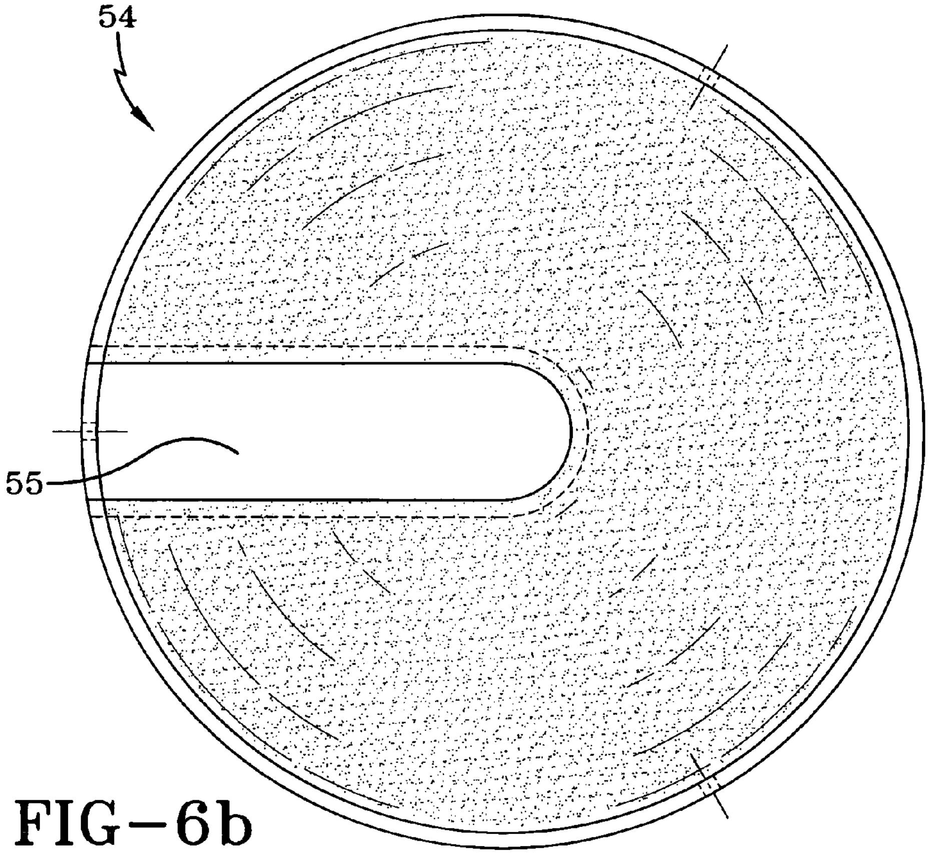
FIG. 6*b* is a top elevational view of an embodiment of the lower dome of the present invention.
Figure 6A:
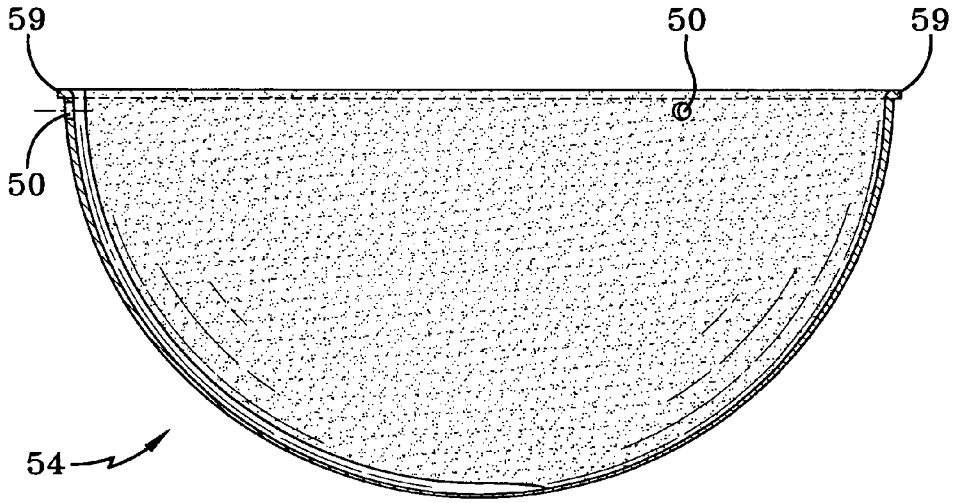
FIG. 6*a* is a side elevational view of an embodiment of the lower dome of the present invention.

An exemplary embodiment of the lower dome 54 of the present invention is shown in FIGS. 6*a* and 6*b*. As can be observed, the lower dome 54 is comprised of pin receptacles 50 defined by a diameter and an at least partially transparent portion 55. The pin receptacles 50 are sized to provide a complementary fit with the pin 40 of the leg 36 as shown in FIGS. 3*a*, 3*b*, and 4. With at least a pin 40 properly placed into a pin receptacle 50, the housing, such as the lower dome 54, is attached to a leg 36. As described earlier with respect to FIG. 4, the pin receptacle 50 may be sufficiently sized so that the pin 40 may undergo non-plastic deformation of the head 41 of the pin as a housing, such as the lower dome 54, is snapped onto the shaft 43 of the pin 40.

In addition, the lower dome 54 may include an at least partially transparent portion 55 that is integrated into the shape and appearance of the entire lower dome 54. In this regard, the at least partially transparent portion 55 is preferably not discernable from the outward appearance of the lower dome 54. As a result, it will be difficult for anyone to determine the aim of a statically mounted surveillance camera or the instantaneous position of a movable camera, such as during a panning mode, and thusly attempt to avoid the view of the camera.

In addition, a combination of exemplary embodiments allows for the illustration of the construction of a separable dome comprised of the upper dome 53 in FIG. 5*a* and the lower dome 54 in FIG. 6*a*. It can be seen that the domes 53 and 54 may be combined to form a generally globe shaped housing or shell for the surveillance camera mount apparatus of the present invention. As shown at the upper flange 57 in FIG. 5*a* and the lower flange 59 in FIG. 6*a* for the upper dome 53 and the lower dome 54, respectively, may have sealing surfaces that discourage the entry of environmental elements such as insects, dust, smoke, and moisture. In addition the sealing surfaces discourage the entry of outside light into the dome that may obscure the view of the camera or allow observers to determine the aim of the camera.

Figure 8:
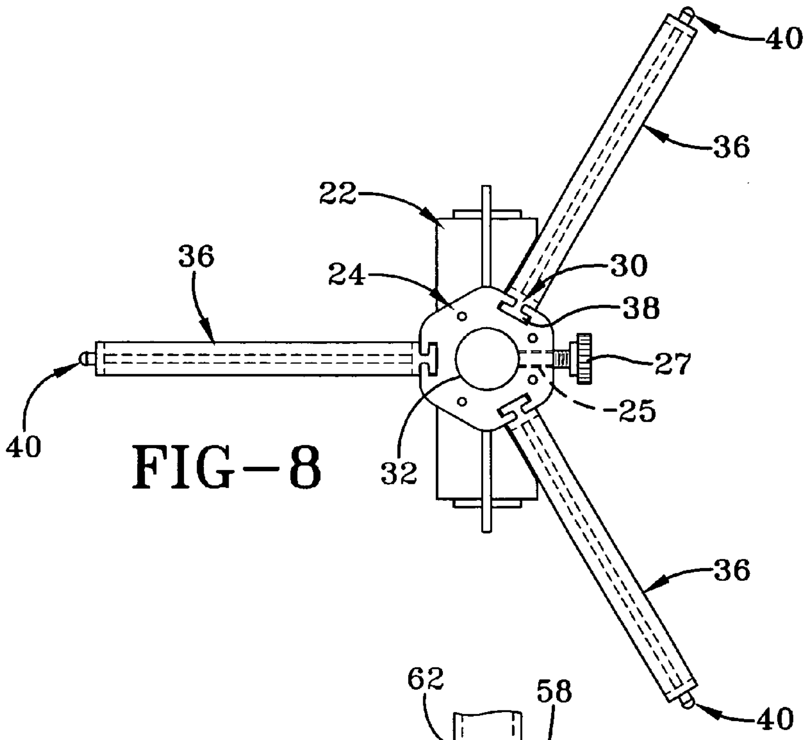
FIG. 8 is a top elevational view of an embodiment of the present invention.
Figure 7:
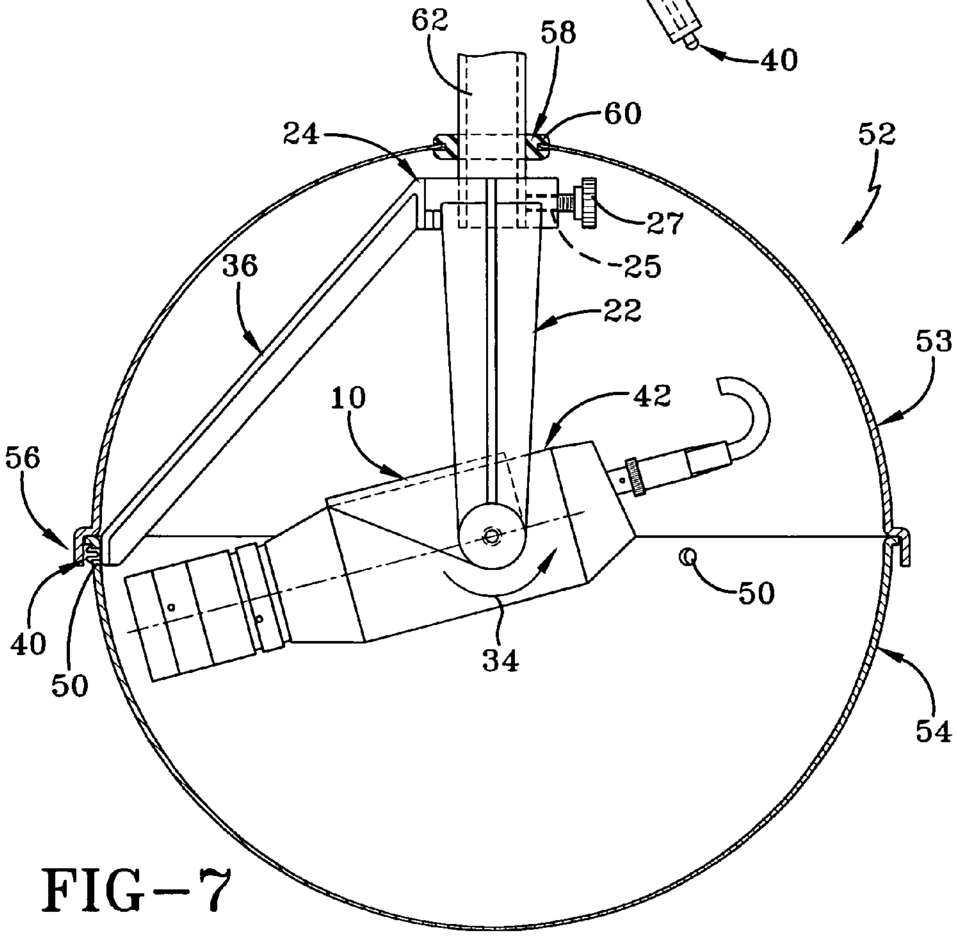
FIG. 7 is a side elevational view of an embodiment of the present invention.

FIGS. 7 and 8 show exemplary embodiments of the present invention. As described previously with regard to the exemplary embodiments of elements of the present invention, FIG. 7 shows a camera, more specifically the top surface 42 of a surveillance camera mounted in the saddle 10. In turn, the outer yoke 22 is shown pivotably attached to the saddle 10. The pivotable attachment allows for rotation of the saddle 10 and the mounted camera about an axis 34. As a result, the vertical aim of the camera can be adjusted by turning the camera mounted in the saddle 10. With regard to horizontal movement or panning of the camera, this movement may be obtained by twisting the outer yoke 22 on an axis generally defined along the vertical length of the conduit 62 that passes through the hole 58 in the upper dome 53 of a globe shaped shell 52 and an O-ring 60. As shown in FIG. 7, the conduit 62 may be secured to the hub 24 by a set screw 27 secured in the threaded insert 25. As shown, the horizontal and vertical adjustments to the aim of the surveillance camera are manual, however, the present invention is adaptable for use with mechanized aiming devices used to aim a camera. Such mechanized aiming devices may comprise remote control devices, electric motors or servos, or wireless transmission of the camera image.

In addition, FIG. 7 shows the lower dome 54 of the globe shaped shell 52 attached to the leg 36 by the pin 40 inserted into the pin receptacle 50. As can be seen from this exemplary embodiment of the present invention, the globe shaped shell 52 is separable into the lower dome 54 and the upper dome 53 at approximately an equator 56 of the globe shaped shell 52.

As described previously with regard to the exemplary embodiments of elements of the present invention, FIG. 8 illustrates the leg connector 38 of the leg 36 attached to the channel 30 of the hub 24 of the outer yoke 22.

Figure 9:
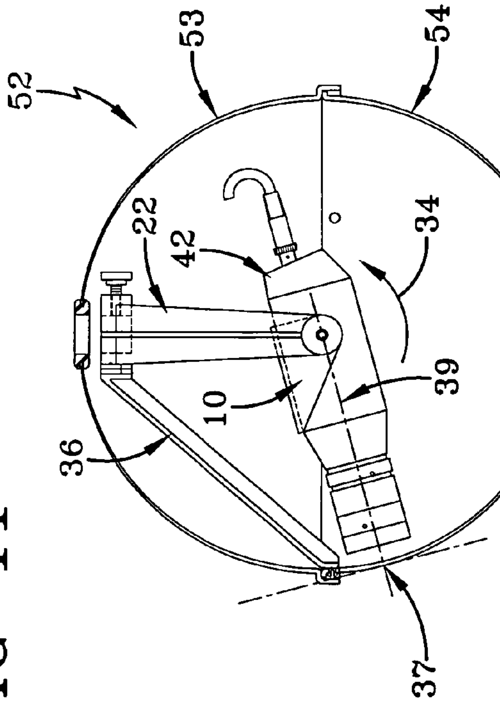
FIG. 9 is a side elevational view of an embodiment of the present invention.
Figure 10:
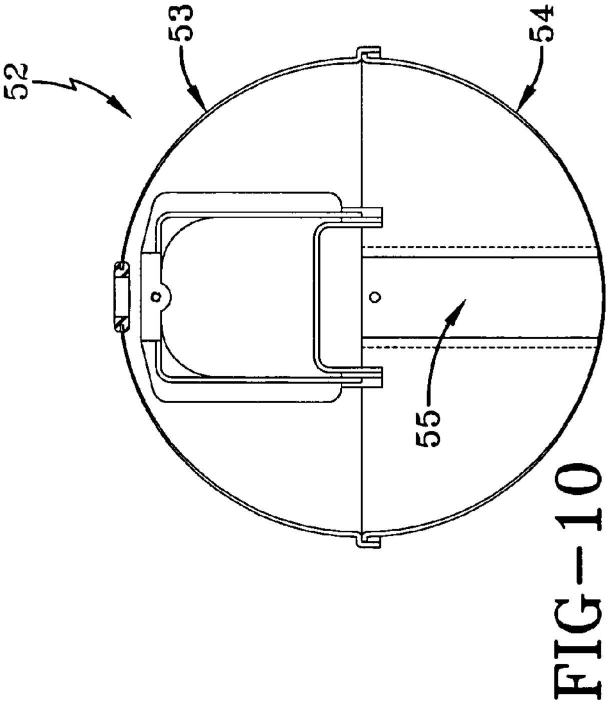
FIG. 10 is a side elevational view of an embodiment of the present invention.
Figure 11:
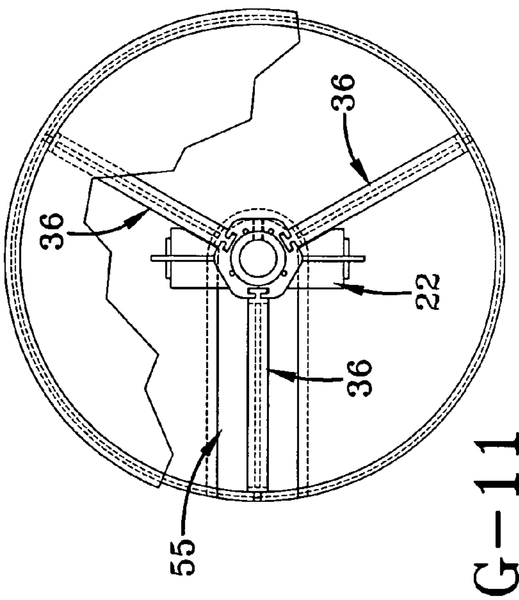
FIG. 11 is a top elevational view of an embodiment of the present invention.

Some surveillance camera are enclosed and shooting through domes or other typically curved surfaces that may produce distorted images at some camera positions due to the changes in focus produced by the curvature of the globe or other curved shielding surfaces. FIGS. 9, 10, and 11 illustrate a feature of the present invention to allow any position of a camera mounted to the saddle 10 of the present invention to maintain an orientation for the optical axis 39 of the camera that is always normal to the tangential surface 37 of the globe shaped shell 52. As a result, images from different positions of a camera within the shell 52 are comparably and consistently focused when shot through any portion of the at least partially transparent portion 55 of the shell 52. FIG. 9 shows the top surface 42 of a camera mounted in the saddle 10. As illustrated previously, the various mounting positions for a camera as provided by a hole 18 or slot 20 may allow for the positioning of a camera within the saddle such that the normal orientation of the optical axis 39 relative to a tangential surface 37 of the globe 52 is maintained regardless of the position of the saddle 10.

Figure 12:
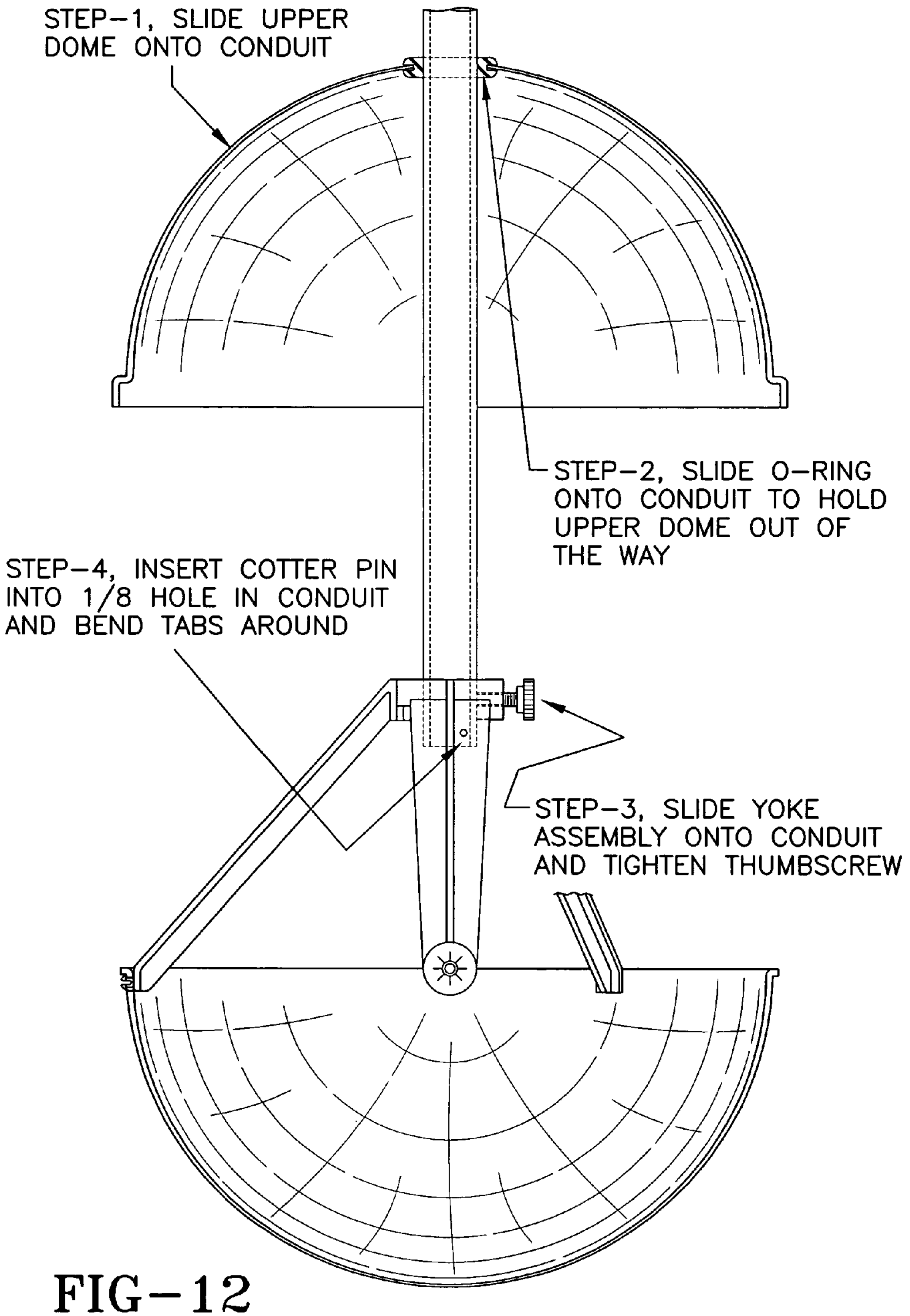
FIG. 12 is a side elevational view of an embodiment of the present invention.

FIG. 12 illustrates steps of the method for installing an example embodiment of the present invention. Those steps include: sliding the upper dome onto a conduit; sliding an O-ring onto the conduit to hold the upper dome out of the way; sliding the yoke assembly onto the conduit and tightening a thumbscrew to hold the yoke; and inserting a cotter pin in a hole in the conduit and bending the tabs of the cotter pin around the conduit.

Figure 13:
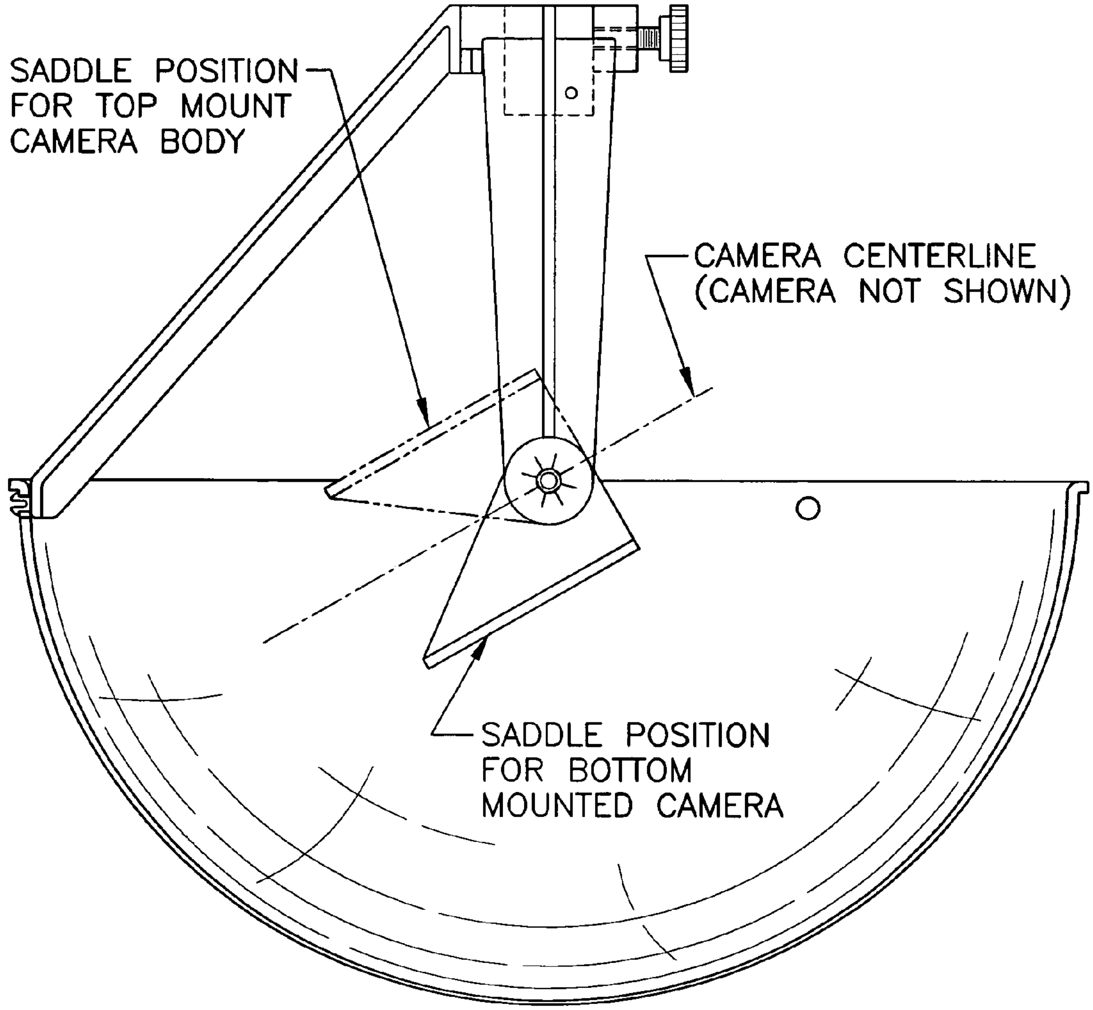
FIG. 13 is a side elevational view of an embodiment of the present invention.

FIG. 13 illustrates some of the alternative embodiments of the present invention including: showing a camera centerline (or an optical axis) relative to a camera (not shown) mounted in a saddle of the present invention; and choosing a saddle position that will place the center of the camera on the center of the pivot point. The typical choices for the saddle position are shown as a saddle position for a top mount camera body and a saddle position for a bottom mount camera body. In either case, it is intended that the choice of mounting will be directed to the preferable installation having the optical axis of the camera remain normal to a tangential surface of the globe of a housing of an embodiment of the present invention.

Figure 14:
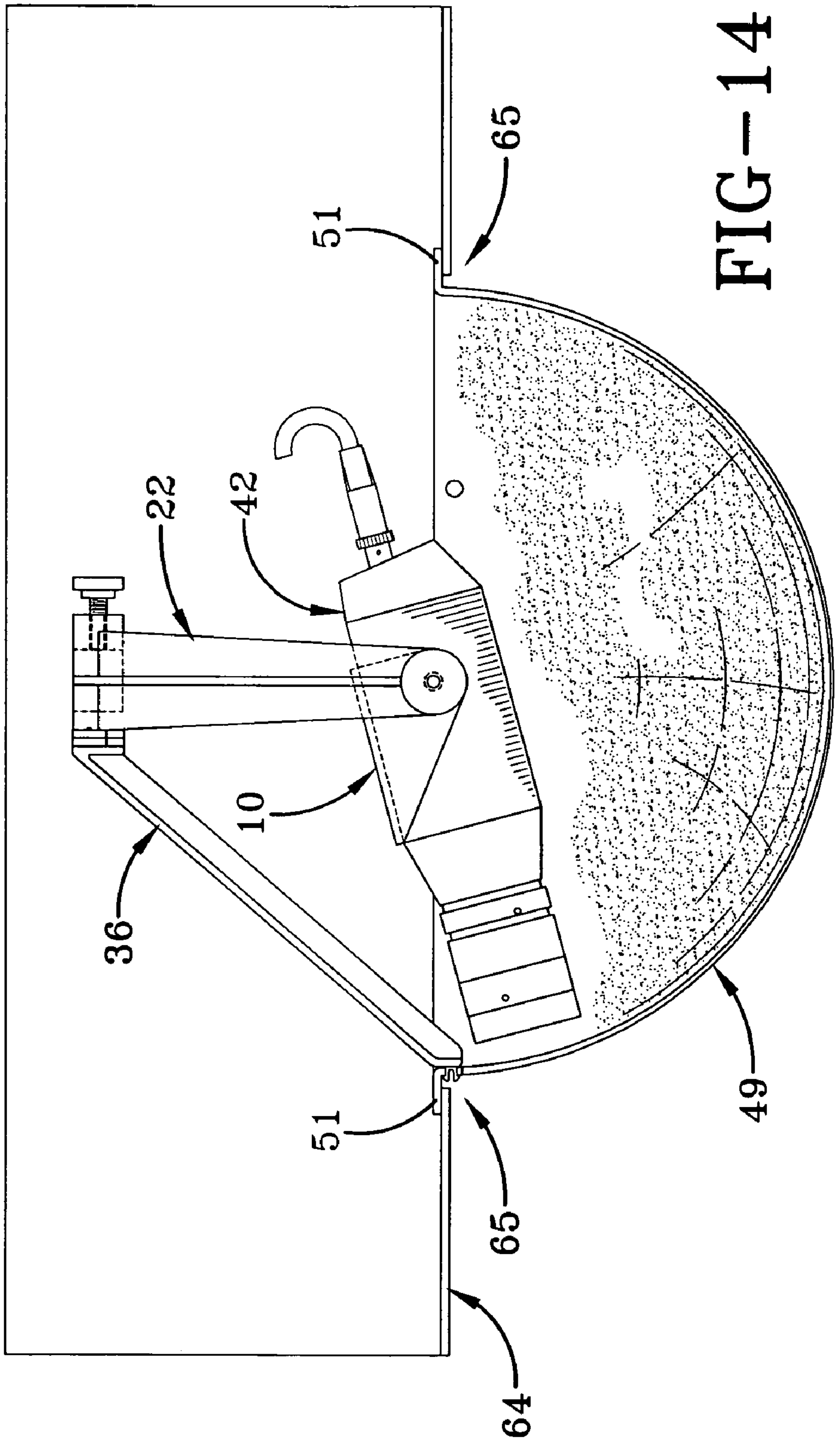
FIG. 14 is a side elevational view of an embodiment of the present invention.
Figure 15:
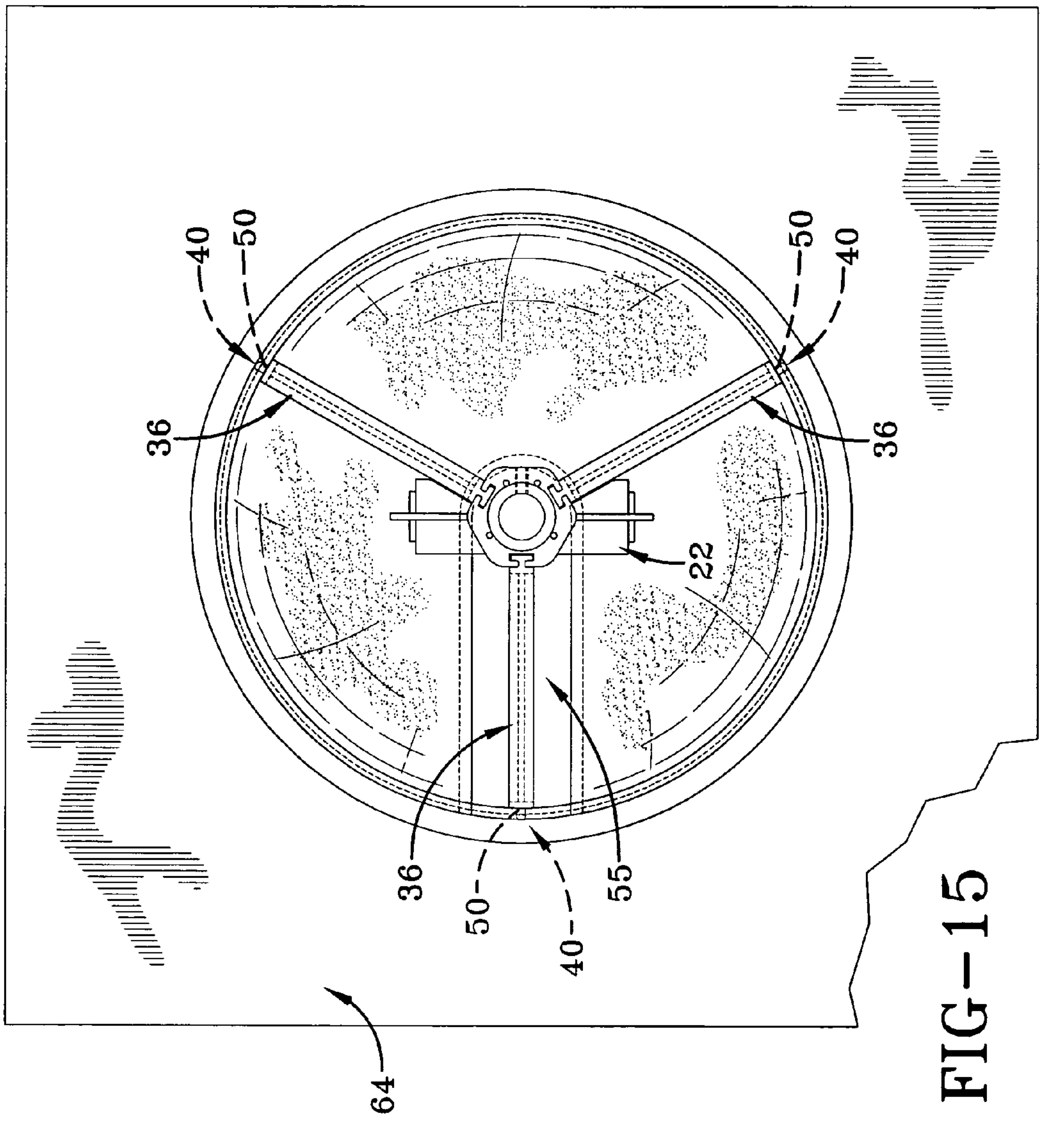
FIG. 15 is a top elevational view of an embodiment of the present invention.

FIGS. 14 and 15 show an exemplary embodiment of the present invention. As can be observed and as described previously, a top surface 42 of a camera is mounted in a saddle 10 that is pivotably attached to the outer yoke 22. In this example, the legs 36 extend to form a connection with the hemispherical shaped shell 49 using pin 40 and pin receptacle 50 attachments as discussed previously. The unit comprised of the camera in the camera mount apparatus of the present invention may then be placed into an opening in a ceiling 64 defined by a perimeter 65. A flange 51 of the hemispherical shaped shell 49 may be provided so that the camera mount apparatus is supported on at least a portion of the perimeter 65 of the opening in the ceiling 64. In an alternative ceiling mount embodiment, an outer yoke 22 may be attached to a conduit (not shown) as discussed previously. The outer yoke 22 is pivotably attached to a saddle 10. This embodiment would not require leg elements to support a housing, since a housing could be supported by its contact with a flange or other projection against at least a portion of a ceiling such as is shown in FIG. 14 of the flange 51 on the perimeter 65 of an opening in a ceiling 64.

As shown in FIG. 15, the present invention may include a three-point alignment for attachment of the legs 36 of a camera mount of the present invention. As shown, the pin receptacles 50 are oriented in the shell 49 such that when the pins 40 of the legs 36 are attached to the shell 49, the saddle 10 is always oriented for installation of a camera aimed toward the at least partially transparent portion 55 of the hemispherical shaped shell 49.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for installing a surveillance camera mount apparatus, said method comprising the steps of:

predrilling a hole in a first end of a conduit sufficiently sized to accept a cotter pin;

sliding and holding an upper dome of a surveillance camera housing onto said conduit, said upper dome having a first flange;

sliding an O-ring onto said conduit, wherein said O-ring has a friction fit with said conduit sufficient to temporarily support said upper dome on said conduit;

positioning said upper dome on said conduit by sliding said O-ring onto said conduit to provide access to at least a portion of said conduit in a vicinity of said first end;

sliding and holding a surveillance camera mount apparatus comprised of a saddle, an outer yoke, and at least one leg onto said conduit in said vicinity of said first end;

inserting a cotter pin through said predrilled hole;

bending said cotter pin to secure said surveillance camera mount apparatus onto said conduit;

installing a lower dome of said surveillance camera housing onto said at least one leg of said surveillance camera mount apparatus, said lower dome having a second flange; and sliding said O-ring and said upper dome on said conduit so that said first flange of said upper dome and said second flange of said lower dome are joined.

2. The method for installing a surveillance camera mount apparatus of claim 1, said method additionally comprising the step of:

tightening a set screw through at least a portion of said surveillance camera mount apparatus to secure said surveillance camera mount apparatus onto said conduit.

3. A surveillance camera mount apparatus, said apparatus comprising:

a saddle for attachment to a surveillance camera, said saddle comprised of:

a base;

a first connecting arm; and a second connecting arm, said first and said second connecting arms at opposite ends of said base;

an outer yoke comprised of:

a hub;

a first hanger arm; and a second hangar arm, said first and said second hangar arms at opposite ends of said hub;

wherein said saddle is nested within said outer yoke and connected along a first axis by pivotable connections between said first connecting arm and said second connecting arm with said first hanger arm of said outer yoke and said second hanger arm of said outer yoke, respectively;

at least one leg having a first end and a second end, said first end of said at least one leg connected to said hub;

a housing connected to said second end of said at least one leg, wherein at least a portion of said housing is at least partially transparent to said surveillance camera;

a pin on said second end of said at least one leg;

at least one pin receptacle defined by a third diameter on a portion of said housing; and wherein said pin receptacle is sized to provide a complementary fit with said pin on said second end of said at least one leg for connecting said housing to said at least one leg.

4. The surveillance camera mount apparatus of claim 3, wherein said saddle, said outer yoke, and said at least one leg are made of an injection molded plastic material.

5. The surveillance camera mount apparatus of claim 3, wherein said base is adapted to be rotated about said first axis for removably securing said base to a top surface of said surveillance camera.

6. The surveillance camera mount apparatus of claim 3, wherein said base is adapted to be rotated about said first axis for removably securing said base to a bottom surface of said surveillance camera.

7. The surveillance camera mount apparatus of claim 3, additionally comprising at least one hole in said base, said at least one hole defined by a first diameter adequately sized for removably securing said surveillance camera to said base with a threaded connector.

8. The surveillance camera mount apparatus of claim 3, additionally comprising at least one slot in said base, said at least one slot defined by a first width and a first length adequately sized for removably securing said surveillance camera to said base with a threaded connector.

9. The surveillance camera mount apparatus of claim 3, additionally comprising at least one channel in said hub, said at least one channel defined by at least a second width and a second length; and a leg connector on said first end of said at least one leg connected to said hub, said leg connector having at least a third width and a third length, wherein said at least said second width and said second length of said at least one channel in said hub provides a complementary fit for said at least said third width and said third length of said leg connector.

10. The surveillance camera mount apparatus of claim 3, additionally comprising a hole defined by a second diameter through said hub, wherein said second diameter is sufficiently sized to provide a complementary fit to a mounting tube for supporting said surveillance camera mount apparatus.

11. The surveillance camera mount apparatus of claim 10, additionally comprising an O-ring to provide a complementary fit to said mounting tube.

12. The surveillance camera mount apparatus of claim 3, wherein said housing is a hemispherical shaped shell.

13. The surveillance camera mount apparatus of claim 12, wherein a flange on said hemispherical shaped shell is adapted to support said surveillance camera mount apparatus on at least a portion of a perimeter of an opening in a ceiling.

14. The surveillance camera mount apparatus of claim 3, wherein said housing is a globe shaped shell comprised of an upper dome and a lower dome.

15. The surveillance camera mount apparatus of claim 14, wherein said upper dome and said lower dome of said globe shaped shell are separable at approximately an equator of said globe shaped shell.

16. The surveillance camera mount apparatus of claim 14, wherein:

side at least one pin receptacle is defined by a third diameter on a portion of said lower dome, wherein said pin receptacle is sized to provide said complementary fit with said pin on said second end of said at least one leg for connecting said lower dome to said at least one leg.

17. The surveillance camera mount apparatus of claim 14, additionally comprising a hole defined by a fourth diameter in said upper dome of said globe shaped shell, wherein said fourth diameter is sufficiently sized to allow a mounting tube for supporting said surveillance camera mount apparatus.

18. The surveillance camera mount apparatus of claim 17, additionally comprising an O-ring to provide a seal between said mounting tube and said hole defined by said fourth diameter in said upper dome of said globe shaped shell.

19. A surveillance camera mount apparatus, said apparatus comprising:

a saddle for attachment to a surveillance camera, said saddle comprised of:

a base;

a first connecting arm; and a second connecting arm, said first and said second connecting arms at opposite ends of said base;

an outer yoke comprised of:

a hub;

a first hanger arm; and a second hangar arm, said first and said second hangar arms at opposite ends of said hub;

wherein said saddle is nested within said outer yoke and connected along a first axis by pivotable connections between said first connecting arm and said second connecting arm with said first hanger arm of said outer yoke and said second hanger arm of said outer yoke, respectively;

at least one leg having a first end and a second end, said first end of said at least one leg connected to said hub;

a housing connected to said second end of said at least one leg, wherein at least a portion of said housing is at least partially transparent to said surveillance camera;

wherein said housing is a globe shaped shell comprised of an upper dome and a lower dome; and additionally comprising a pin on said second end of said at least one leg comprised of:

at least one pin receptacle defined by a third diameter on a portion of said lower dome, wherein said pin receptacle is sized to provide a complementary fit with said pin on said second end of said at least one leg for connecting said lower dome to said at least one leg.

20. The surveillance camera mount apparatus of claim 19, wherein said saddle, said outer yoke, and said at least one leg are made of an injection molded plastic material.

21. The surveillance camera mount apparatus of claim 19, wherein said base is adapted to be rotated about said first axis for removably securing said base to a top surface of said surveillance camera.

22. The surveillance camera mount apparatus of claim 19, wherein said base is adapted to be rotated about said first axis for removably securing said base to a bottom surface of said surveillance camera.

23. The surveillance camera mount apparatus of claim 19, additionally comprising at least one hole in said base, said at least one hole defined by a first diameter adequately sized for removably securing said surveillance camera to said base with a threaded connector.

24. The surveillance camera mount apparatus of claim 19, additionally comprising at least one channel in said hub, said at least one channel defined by at least a second width and a second length; and a leg connector on said first end of said at least one leg connected to said hub, said leg connector having at least a third width and a third length, wherein said at least said second width and said second length of said at least one channel in said hub provides a complementary fit for said at least said third width and said third length of said leg connector.

25. The surveillance camera mount apparatus of claim 19, additionally comprising a hole defined by a second diameter through said hub, wherein said second diameter is sufficiently sized to provide a complementary fit to a mounting tube for supporting said surveillance camera mount apparatus.

26. The surveillance camera mount apparatus of claim 25, additionally comprising an O-ring to provide a complementary fit to said mounting tube.

27. The surveillance camera mount apparatus of claim 25, wherein said mounting tube is electrical conduit.

28. The surveillance camera mount apparatus of claim 19, wherein said housing is a hemispherical shaped shell.

29. The surveillance camera mount apparatus of claim 28, wherein a flange on said hemispherical shaped shell is adapted to support said surveillance camera mount apparatus on at least a portion of a perimeter of an opening in a ceiling.

30. The surveillance camera mount apparatus of claim 19, wherein said at least one pin receptacle is defined by a third diameter on a portion of said housing, wherein said pin receptacle is sized to provide said complementary fit with said pin on said second end of said at least one leg for connecting said housing to said at least one leg.

31. The surveillance camera mount apparatus of claim 19, wherein said upper dome and said lower dome of said globe shaped shell are separable at approximately an equator of said globe shaped shell.

32. The surveillance camera mount apparatus of claim 19, additionally comprising a hole defined by a fourth diameter in said upper dome of said globe shaped shell, wherein said fourth diameter is sufficiently sized to allow a mounting tube for supporting said surveillance camera mount apparatus.

33. The surveillance camera mount apparatus of claim 32, additionally comprising an O-ring to provide a seal between said mounting tube and said hole defined by said fourth diameter in said upper dome of said globe shaped shell.

* * * * *